Feb. 16, 1954   E. H. JOHNSON   2,669,458
CHUCK
Filed April 19, 1952
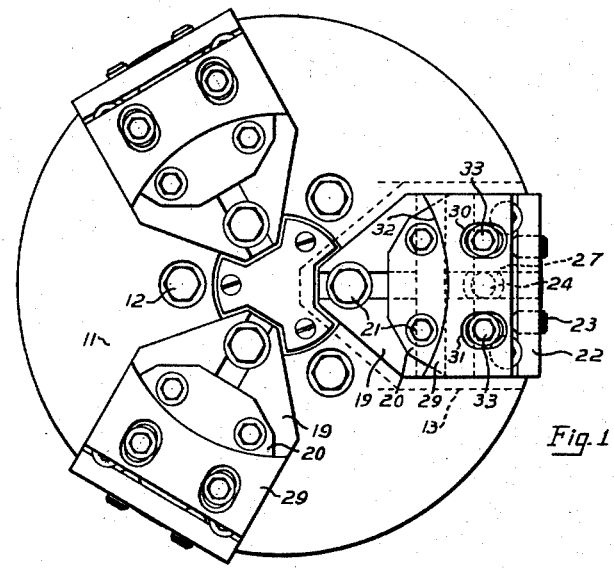
Fig. 1
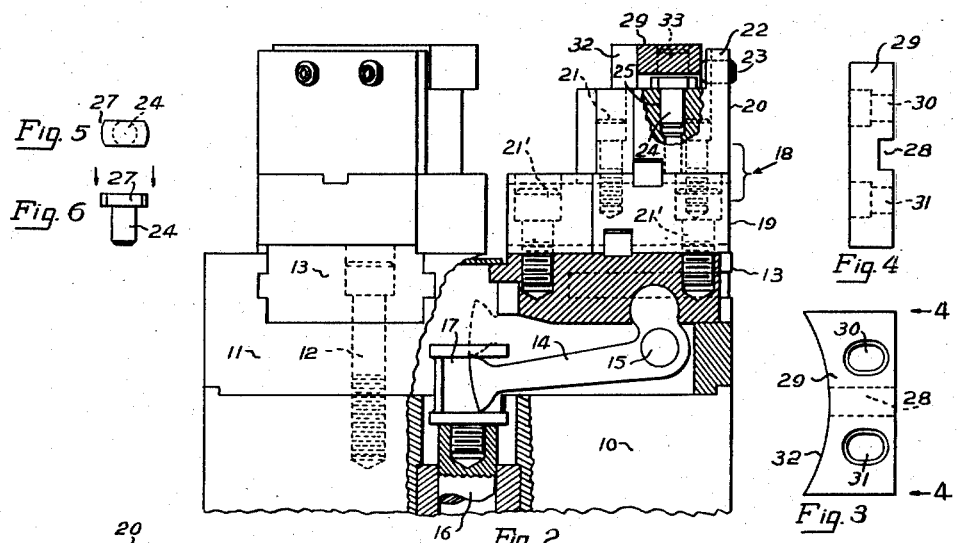
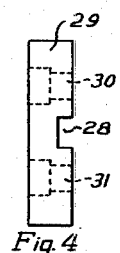
Fig. 4
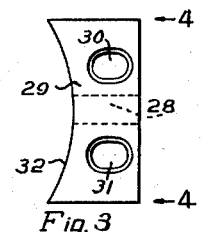
Fig. 3
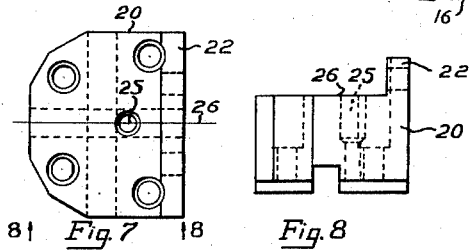
Fig. 7   Fig. 8
INVENTOR
ERNEST H. JOHNSON
BY
ATTORNEY Patented Feb. 16, 1954

2,669,458

UNITED STATES PATENT OFFICE 2,669,458

CHUCK

Ernest H. Johnson, Bridgeport, Conn., assignor to The Bullard Company, a corporation of Connecticut Application April 19, 1952, Serial No. 283,190

7 Claims. (Cl. 279—123)

This invention relates to chucks for machine tools and particularly to a new and improved top-jaw construction for chucks.

All chucks have inherent inaccuracies in that manufacturing tolerances for machining the jaw ways results in the center lines of the jaw ways intersecting at points other than the true center of rotation of the chuck spindle.

Cylindrical work to be properly gripped by a set of chuck top-jaws requires two fundamental conditions to be met, namely, the work-engaging surfaces of the top-jaw inserts must be absolutely concentric with the center of rotation of the work-rotating spindle, and the radial distance of the work-engaging surface of the top-jaw inserts must be identical.

These two fundamental requirements have led to the fabrication of top-jaw inserts by a method that requires final turning and/or grinding of the work-engaging surfaces thereof while the top-jaws are attached to the work-supporting spindle with which they ultimately are to be employed. The attending disadvantages of top-jaw inserts made by such a method are manifest. Down time for replacing top-jaw inserts is harmful to production schedules and particularly so in those cases where multiple spindle machines are concerned; interchangeability of top-jaws is impossible because only the inserts of top-jaws for a given spindle are accurate enough for that spindle; damage to any one top-jaw insert requires as much down time to replace it as would be required to replace an entire set of top-jaw inserts; and accuracy in chucking is limited because variations in chucking pressures causes unpredictable stress and strain variations in the links of the chuck-jaw actuating mechanism resulting in material run out during a turning operation, which requires re-surfacing the inserts for every substantial change in chucking pressures.

The principal object of this invention is to provide a chuck-jaw assembly including a completely pre-fabricated top-jaw insert that is at all times interchangeable with comparable inserts employed with top-jaws for any work-supporting spindle.

Other objects include the provision of a top-jaw insert adapted to be adjusted radially, as well as angularly, relatively to the top-jaw to which it is attached; the provision of such a top-jaw insert which can be adjusted relatively to its supporting top-jaw to compensate for unpredictable strains and stresses in the jaw-actuating linkage; and the provision of a chuck-jaw construction in which a radially-movable lower jaw supports a top-jaw that in turn supports a top-jaw insert for movement along the longitudinal axis of the lower jaw, as well as for pivotal movement about a point located along said axis.

Other objects include the provision of such a top-jaw in which an insert is capable of being adjustably mounted for maintaining its pre-fabricated work-engaging surface in perfect concentricity with the axis of rotation of the work-supporting spindle with which it is employed; the provision of such a top-jaw and insert therefor that employs a single mounting member to provide pivotal adjustment of the insert about a point and radial adjustment relatively to the axis of rotation of the spindle with which such top-jaw and insert are to be employed.

The above, other objects and novel features of the invention will become apparent from the following specification and accompanying drawing, in which:

Figure 1 is a plan view of a rotatable chuck to which the principles of the invention have been applied;

Fig. 2 is a sectional elevational view of the chuck shown in Fig. 1;

Fig. 3 is a plan view of the top-jaw insert forming a part of the present invention;

Fig. 4 is a view of the top-jaw insert of Fig. 3 looking in the direction of the arrows 4—4 of Fig. 3;

Figs. 5 and 6 are views of a detail of the invention, and

Figs. 7 and 8 are plan and elevational views of part of the top-jaw to which the principles of this invention have been applied.

Referring to Figs. 1 and 2, the principles of the invention have been shown as applied to a power operated chuck including a spindle head 10, the lower portion (not shown) of which is reduced in diameter to form a spindle adapted to be rotated by a suitable source of power. The spindle head 10 supports a chuck body 11 and the two are fixed together by screws 12. Slidable chuck jaws 13 are adapted to be moved substantially radially relatively to the axis of rotation of the spindle head 10 by the action of jaw levers 14 that are pivoted on pins 15 within the chuck body 11. Jaw levers 14 are connected to a draw bar 16 through a spool connection 17 that compensates for the angularity of the jaw levers 14 when the draw bar 16 is reciprocated rectilinearly. A top-jaw assembly 18, which in the present embodiment comprises a lower member 19 and an upper member 20 fixed to each other by cap screws 21, is fixed to each sliding jaw 13 by cap screws 21'. While the top-jaw construction is shown as being in two parts, it may, if desired, be made in more than two or as a unitary structure without in any way departing from the principles of the invention. The outer portion of the top-jaw construction 18 is provided with a flange 22 through which spaced set screws 23 extend, for a purpose to be described later. A headed pin 24 is mounted for pivotal movement within a bore 25, the center line of which is located within a plane including the longitudinal axis 26 of the member 20 (Fig. 7). The head of the pin 24 is shown as substantially rectangular in shape and forms a key 27 that slidingly engages the walls of a key-way 28 formed in the under surface of a top-jaw insert 29. A pair of elongated bored and counterbored holes 30 and 31 are located on each side of the key-way 28 with their major axes parallel with said key-way 28, and their minor axes in a common plane bisecting bore 25 and at right angles to the key-way 28.

From the foregoing, it is evident that the top-jaw insert 29 can be mounted so that the key-way 28 registers with the head 27 of the pin 24 and limited radial and pivotal movement along the head 27 and about the pivotal axis of the pin 24 can be effected. When the top-jaw insert 29 has been properly adjusted in order that its work-engaging surface 32 is at the correct radial position and such that the radii of the arcuate surface 32 pass through the axis of rotation of the spindle 10, the insert 29 can be fixed in position by tightening the cap screws 33.

The preferred method of using the new and improved chuck-jaw assembly is to produce a master ring or turned part of a diameter equal to that of the work to be gripped. This ring is set into position between the chuck-jaw inserts 29, which are tightly held by the screws 33, and the chucking pressure to be employed during a working operation is applied to the chuck-jaws by applying the correct pull to the draw bar 16. An indicator is set up in the usual manner and the master ring is checked for run out. Adjustment of the inserts 29 is effected by slightly loosening the screws 33 and adjusting the members 29 by turning the set screws 23 in a manner to correct the run out, after which screws 33 are tightened. This adjusting and indicating operation is repeated until no run out exists with the master ring. Screws 33 are finally pulled down hard and the master ring is removed.

Any substantial change in chucking pressure will require re-adjustment of the inserts 29 in accordance with the above method.

Although the various features of the improved chuck-jaw assembly have been shown and described in detail to fully disclose one embodiment of the invention, it will be evident that numerous changes may be made in such details, and certain features can be used without others without departing from the principles of the invention.

What is claimed is:

1. A chuck comprising in combination, a base; a lower jaw mounted on said base, and adapted to be moved along a line substantially radiating from the center of said chuck; a top-jaw mounted on, and fixed to said lower jaw; a top-jaw insert mounted on said top-jaw for limited pivotal, as well as radial movement relatively to said lower jaw; and means for locking said insert to said top-jaw in a selected pivotal and radially-adjustable position.

2. A chuck comprising in combination, a base; a lower jaw mounted on said base, and adapted to be moved along a line substantially radiating from the center of rotation of the chuck; a top-jaw mounted on, and fixed to said lower jaw; a pivot pin mounted in said top-jaw with its pivotal axis in a radial plane of said chuck, said pin including a head; a top-jaw insert including a key-way on its bottom surface adapted to receive the head of said pin; and means for fixing said insert to said top-jaw in any of a number of pivotal and radial positions.

3. A chuck comprising in combination, a base; a lower jaw mounted on said base, and adapted to be moved along a line substantially radiating from the center of rotation of the chuck; a top-jaw mounted on, and fixed to said lower jaw; an upwardly extending flange at the outer edge of said top-jaw; a top-jaw insert pivotally mounted on said top-jaw; spaced adjusting screws extending through said flange for pivotally adjusting said insert; and means for fixing said insert to said top-jaw in a pivotally-adjustable position.

4. A chuck comprising in combination, a base; a lower jaw mounted on said base, and adapted to be moved along a line substantially radiating from the center of rotation of the chuck; a top-jaw mounted on, and fixed to said lower jaw; a top-jaw insert mounted on a pivot pin located in said top-jaw with its pivotal axis in the plane including said radial line; and elongated holes passing through said insert and located on each side of said plane for receiving locking screws that are adapted to screw into said top-jaw.

5. A chuck comprising in combination, a base; a lower jaw mounted on said base, and adapted to be moved along a line substantially radiating from the center of rotation of the chuck; a top-jaw mounted on, and fixed to said lower jaw; an upwardly extending flange at the outer edge of said top-jaw; a top-jaw insert pivotally mounted on said top-jaw; spaced adjusting screws extending through said flange for pivotally adjusting said insert; elongated holes passing through said insert and located on each side of said radiating line, the major axes of said holes being parallel with said radiating line; and screws passing through said holes for locking said insert to said top-jaw.

6. A chuck comprising in combination, a base; a lower jaw mounted on said base, and adapted to be moved along a line substantially radiating from the center of rotation of the chuck; a top-jaw mounted on, and fixed to said lower jaw; a top-jaw insert mounted on a pivot pin located in said top-jaw with its pivotal axis in the plane including said radial line; elongated holes passing through said insert and located on each side of said radial line, the major axes of said holes being parallel with said radial line, and the minor axes of which lie in a plane at right angles to said radial line and passing through the pivotal axis of said pivot pin.

7. A chuck comprising in combination, a base; jaw means mounted on said base, and adapted to be moved along a line substantially radiating from the center of rotation of the chuck; an upwardly extending flange at the outer edge of said jaw means; a jaw insert mounted on said jaw means for pivotal as well as radial movement relatively to said jaw means; spaced adjusting screws extending through said flange for adjusting said insert; and means for fixing said insert to said jaw means in an adjusted position.

ERNEST H. JOHNSON.

References Cited in the file of this patent

UNITED STATES PATENTS

| Number | Name | Date |
|---|---|---|
| 1,794,511 | Bush | Mar. 3, 1931 |
| 2,514,472 | Cassidy | July 11, 1950 |
| 2,569,056 | Highberg | Sept. 25, 1951 |